Nov. 24, 1953

R. M. SOMERS 2,660,623

PHONOGRAPHIC REPRODUCING MACHINE

Filed July 29, 1948

3 Sheets-Sheet 1

INVENTOR.
Richard M. Somers
BY
Henry Lanahan
ATTORNEY

Nov. 24, 1953

R. M. SOMERS 2,660,623

PHONOGRAPHIC REPRODUCING MACHINE

Filed July 29, 1948

3 Sheets-Sheet 2

INVENTOR.
Richard M. Somers

BY Henry Lanahan

ATTORNEY

Nov. 24, 1953 R. M. SOMERS 2,660,623

PHONOGRAPHIC REPRODUCING MACHINE

Filed July 29, 1948

3 Sheets-Sheet 3

INVENTOR.
Richard M. Somers

BY Henry Lanahan

ATTORNEY

Patented Nov. 24, 1953

2,660,623

UNITED STATES PATENT OFFICE 2,660,623

PHONOGRAPHIC REPRODUCING MACHINE

Richard M. Somers, West Orange, N. J., assignor to Thomas A. Edison, Incorporated, West Orange, N. J., a corporation of New Jersey Application July 29, 1948, Serial No. 41,291

11 Claims. (Cl. 179—100.4)

This invention relates particularly to machines for reproducing recorded dictation.

The invention is especially adapted to a disk-record type of dictating machine as shown and described in the pending application Serial No. 14,506 (now Patent No. 2,533,359, dated December 12, 1950) of the present inventor and Charles W. Dann, filed March 12, 1948, and having a common assignee with the present application; no unnecessary limitation either to this particular machine or to machines generally of the disk record type is however intended.

In some respects, as will hereinafter appear, the invention is particularly related to machines of the character described for reproducing recordations made by the embossing method.

Machines for reproducing dictation are arranged to enable easy backspacing of the reproducer relative to the record so that the transcriber may "listen back" at will to portions of the recorded matter which she may not have heard correctly during the first reproduction thereof as because of surrounding noises or other distractions. By the present invention, the machine is provided with a simplified operating mechanism which requires only a minimum number of manipulations thereon to exercise full control thereover, and which permits a backspacing to be initiated selectively either at the machine or at a remote station. Moreover, this machine is arranged so as not to cause any possible damage to the record or to give rise to any distracting noises in the receiver during backspacing. The elimination of possible damage to the record is particularly important in connection with recordations made by the embossing method since it is found that the ridges which are raised along the side edges of the groove convolutions, and which are necessary for effective tracking of the reproducer, may be easily damaged if the reproducer is dragged across the groove convolutions while it has its normal pressure on the record.

An object of the invention is to provide particularly an improved machine for reproducing dictation recorded on disk records.

Another object of the invention is to relieve pressure of the reproducer from the record, without however disengaging it from the record, during the backspacing thereof.

Another object is to disable the audio system of the machine during backspacing so that no distracting noises are then produced in the receiver.

Another object is to center the reproducer and concurrently relieve pressure of the same from the record, but without lifting it from the record, as an incident of backspacing.

Another object is to provide a reproducing machine of the character described wherein the reproducer is lifted from and lowered onto the record only as an incident of removing the record from and mounting a new record on the machine.

A further object is to provide novel and improved control mechanisms for carrying out the aforestated objectives.

Other and allied objects and features of the invention will be apparent from the following description and the appended claims.

In the description of my invention reference is had to the accompanying drawings, of which:

Figures 1, 2, 3:
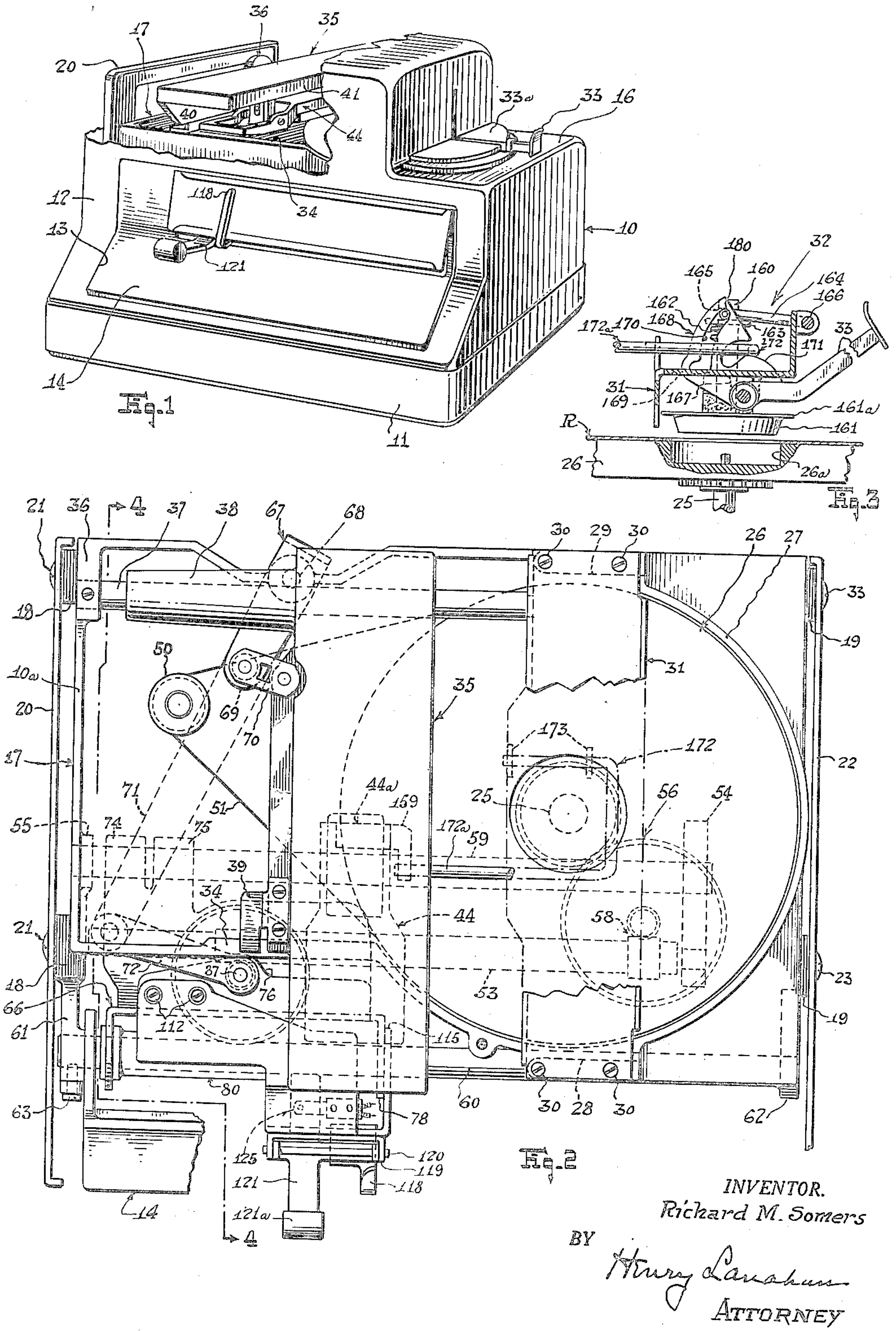
Figure 1 is a perspective view, with parts broken away, of a phonographic reproducing machine incorporating my invention.
Figure 2 is a top plan view, with parts broken away, of the operating mechanism of this machine.
Figure 3 is a fractional view, with parts in section, illustrating the record-clamping mechanism of the present machine.

The machine shown in the accompanying drawings has a housing 10 provided with a rectangular base 11. The housing has a front wall 12 a lower portion of which slopes downwardly and forwardly; in this front wall there is a large opening 13 to expose a section 14 of the frame of the machine. At its right end the housing has an extending portion of reduced height to provide a horizontal platform 16 whereby to facilitate the mounting of a record on and the removal of the same from the machine.

The frame of the machine comprises a horizontal top plate 17 provided with pairs 18 and 19 of laterally-projecting bosses at its left and right sides respectively (Figure 2). The left pair of bosses engage an upstanding channeled frame member 20 and are secured thereto by screws 21. Similarly, the right pair of bosses engage an upstanding channeled frame member 22 and are secured thereto by screws 23. The left one of these channeled frame members extends from the base 11 through the full height of the housing but the right one extends from the base only to the level of the platform 16.

Figures 4, 5, 6, 7:
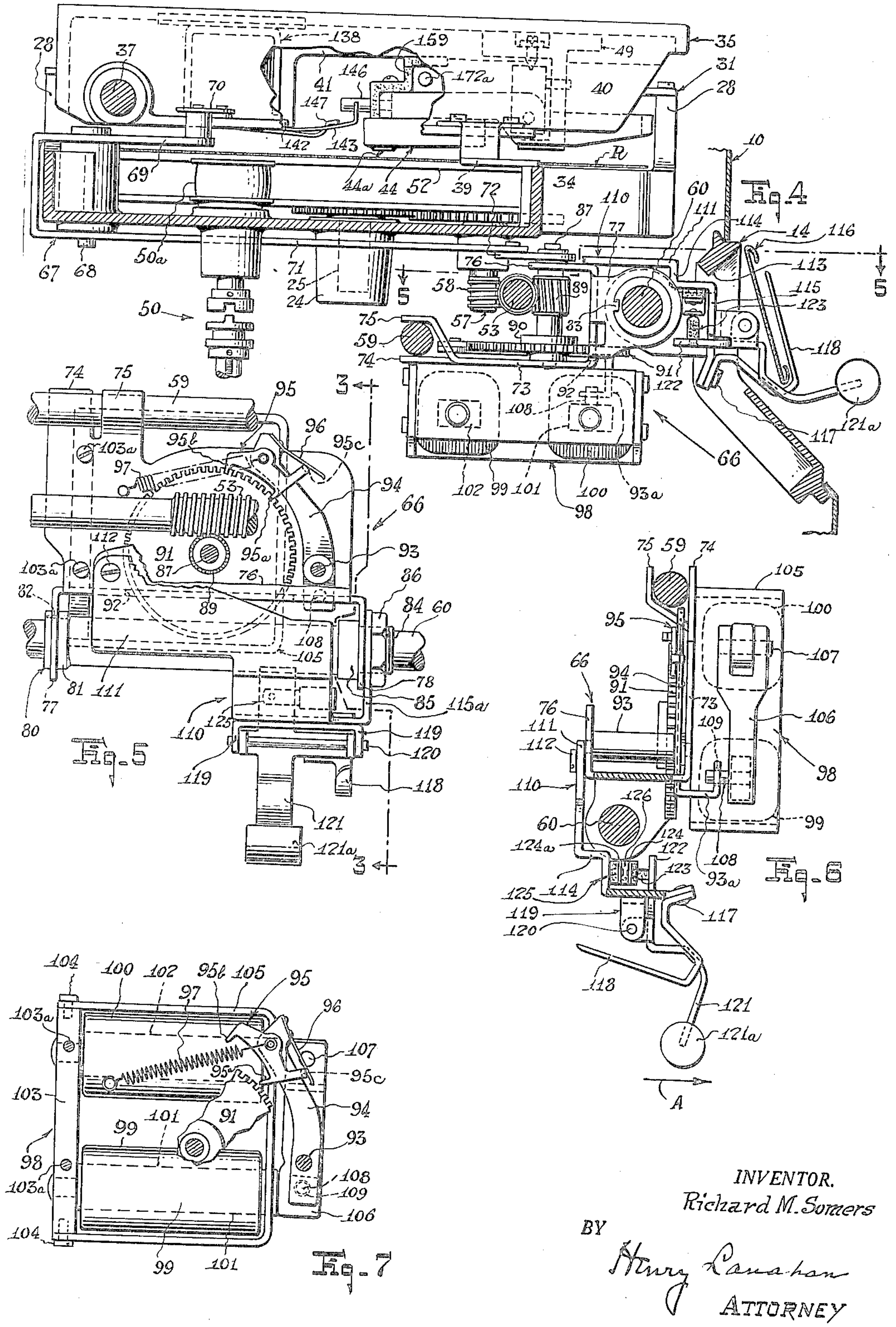
Figure 4 is a sectional view, with parts broken away, taken substantially on the line 4—4 of Figure 2.
Figure 5 is a fractional section taken substantially on the line 5—5 of Figure 4 and showing a drive transmission of the machine in its normal engaged condition.
Figure 6 is a fractional section taken substantially on the line 3—3 of Figure 5.
Figure 7 is a fractional view of the mechanism of Figure 5 showing the relative positioning of the parts when the drive transmission is disengaged.

The top plate 17 is provided with a bearing 24 in its central right-hand portion (Figure 3) in which there is journalled a depending shaft 25 of a turntable 26. Surrounding the right half of this turntable is an arcuate flange 27 standing up from the top plate to a level just short of the top face of the turntable. In diametrically-opposite relation to the turntable are front and back standards 28 and 29 integral with the top plate 17. Mounted on these standards, and secured thereto by screws 30, is a channeled frame member 31 (fractionally shown) which bridges the turntable from front to back as shown in Figures 2 and 4. This channeled frame member 31 carries a record-clamping mechanism 32 operable by a handle 33 as shown fractionally in Figures 1 and 3. This clamping mechanism is described fully in the pending application of Charles W. Dann, Serial No. 780,036 (now Patent No. 2,524,561, dated October 3, 1950), filed October 15, 1947, and having common ownership with the present application. For the present purposes this clamping mechanism is sufficiently described as follows: a vertically-movable shaft 160 is slidably mounted in the channeled frame member 31 and has at its lower end a frusto-conical clamping member 161 provided with a peripheral rim 161a. As the shaft 160 is moved downwardly the frusto-conical portion of the clamping member passes through a central hole in a record R on the turntable and enters a central well 26a in the turntable and then the rim 161a comes to bear against the record to clamp it to the turntable. This shaft 160 is urged upwardly by a compression spring 162 provided between the frame 31 and a collar 163 on the shaft. The collar is held in place by one arm of a lever 164 which engages a notch 165 provided in the upper end of the shaft 160. This is a U-shaped lever having the other arm thereof pivoted to the frame 31 on a transverse horizontal axis as at 166. Pivoted to lugs 167 struck downwardly from the frame 31, also on a horizontal transverse axis, is the handle 33. Secured to this handle is a cam plate 168 which extends upwardly through a slot 169 provided in the frame 31. This cam plate has a cam slot 170 which receives a roller 180 provided on the free end of the lever 164. This slot is shaped so as to cam the shaft 160 downwardly as the handle 33 is depressed and then to detent the handle in its actuated position. Additionally, the cam plate has a cam 171 on which rests the transverse member of a U-lever 172. This U-lever 172 has one arm thereof pivoted on a horizontal laterally-extending axis as to a pair of lugs 173 struck upwardly from the frame 31. This latter cam is shaped to retain the U-lever 172 in a raised position when the clamping mechanism is unactuated (Figure 3) and to release it so that it may move to a lowered position in response to its own weight when the clamping mechanism is actuated. However, as is described in the aforementioned pending Dann application Serial No. 780,036, this lever is released as the clamping mechanism is actuated only if a record is then on the turntable; however, details as to this feature of the machine need not be herein described in detail. This U-lever has a long leftwardly-extending arm 172a which serves to retain the reproducer in a raised ineffective position whenever the clamping mechanism is unactuated, as will hereinafter more fully appear.

The right-hand portion of the turntable overlies the platform 16 to enable a record to be easily mounted on and removed therefrom. However, this right-hand portion is normally covered by a shallow arcuate cover 33a. The cover is hinged to the housing and is raised to an open position as the handle 33 is raised to release the record-clamping mechanism. This part of the machine, however, need not be herein described in detail since the same is the subject of my pending application Serial No. 773,129 (now Patent No. 2,538,392, dated January 16, 1951), filed September 10, 1947, and entitled "Closure for Phonograph."

The arcuate flange 27 extends a distance to the left of the front standard 28 and then leads into a transverse rectilinear rail 34 for slidably supporting the forward end of a carriage 35. This rail leads at its leftward end into an upstanding flange 10a which extends along the leftward and rearward sides of the top plate to the back standard 29. At the rear of the top plate between a standard 36 at the left corner thereof and the channeled frame member 31 there is a laterally-extending rod 37. The carriage 35 has a long bearing 38 at its rearward end which is slidably mounted on this rod. At the forward end of the carriage there is a depending foot 39 (Figures 2 and 4) which rests slidably on the rail 34. The carriage is thus mounted for back-and-forth lateral traveling movement across the left-hand portion of a supported record.

Figures 8, 9, 10, 11:
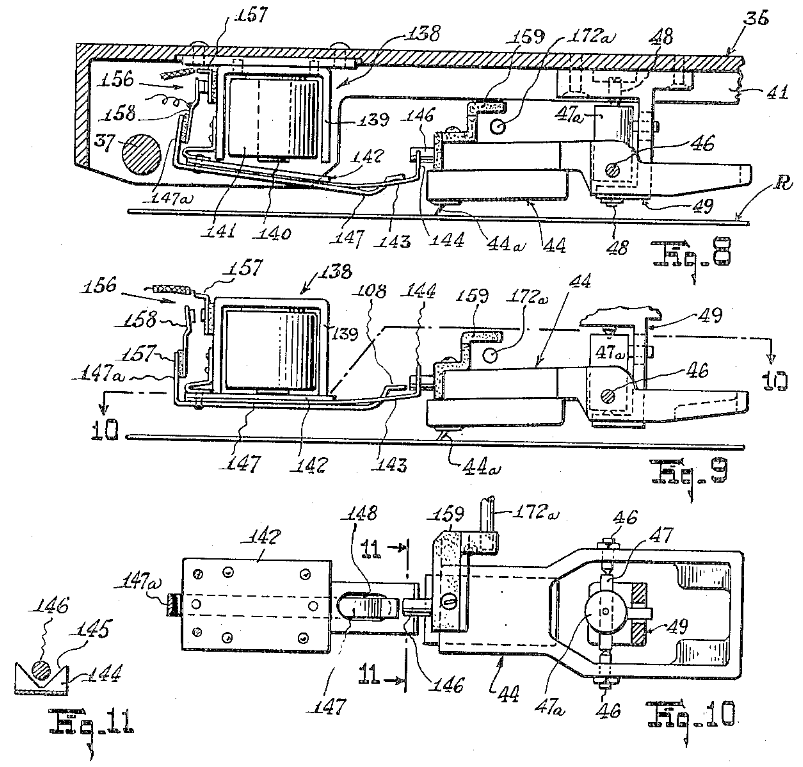
Figure 8 is a left-hand view of the carriage and mechanism carried thereby, with parts of the carriage broken away, showing the centering and pressure-relieving means for the reproducer in its unactuated condition.
Figure 9 is a partial view of the mechanism of Figure 8 showing the centering and pressure-relieving means in its actuated condition.
Figure 10 is a sectional view taken substantially on the line 10—10 of Figure 9.
Figure 11 is a detailed section taken substantially on the line 11—11 of Figure 10.

The carriage 35 comprises a top wall having a depending flange 40 along the full length thereof at its left side and having a similar such flange 41 at its right side but of a full height along only the rearward portion thereof. In the forward portion of this carriage there is a reproducing-type translating device 44—otherwise herein referred to simply as a reproducer—which has a depending stylus 44a at its rearward end. This reproducer has a pair of cone pivots 46 at its forward end which pivotally engage the ends of a horizontal, laterally-extending rod 47 (Figure 10) carried by a vertical cylinder 47a. This cylinder is journalled at its vertical axis on two cone pivots 48 carried by a U-shaped standard 49 that is mounted on the under side of the carriage (Figure 8). Thus, the reproducer is supported universally for both vertical and lateral movement of its stylus relative to the record R.

The drive mechanism for turning the turntable and effecting a traveling movement of the carriage 35 comprises a motor 134 (Figure 12) which is coupled by way of a clutch 50 to a drive pulley 50a that is journalled in the top plate 17. This drive pulley is coupled directly to the turntable by a belt 51 which rides in a peripheral groove 52 of the turntable. The carriage is driven by the turntable through a drive transmission comprising a laterally-extending feed screw 53 that is journalled at its ends on two cone pivots carried by respective standards 54 and 55 depending from the top plate 17. The shaft 25 of the turntable is coupled by a gear train 56 (Figure 2) to a vertical shaft 57 journalled in the top plate, and the latter shaft is coupled by spiral gearing 58 (Figures 2 and 4) to the feed screw so that the feed screw is driven whenever the turntable is rotated. At the back side of the feed screw and in parallel relation thereto is a rod 59 fixedly held at its ends in standards 54 and 55, and at the front side of the feed screw there is a rod 60 having the end portions thereof mounted in standards 61 and 62 depending from the top plate 17, the shaft being held in place by a set screw 63 (Figure 2). These rods 59 and 60 have slidably mounted thereon a carriage 66 which is moved progressively therealong by the feed screw 53 as is hereinafter described. This carriage 66 serves particularly as a traveling support for certain controls of the machine as will hereinafter appear.

Coupled to the carriage 66 is the carriage 35 for the reproducer 44. The coupling means of the drive transmission between these carriages comprises a lever 67 (Figures 2 and 4) which is pivoted at 68 to the rearward part of the top plate. This lever 67 has a short horizontal arm 69 above the top plate coupled by a short link 70 to the carriage 35, and has a relatively long horizontal arm 71 below the top plate coupled by a link 72 to the carriage 66.

The carriage 66 comprises a lower horizontal plate 73 having two rearwardly-extending lugs 74 and 75 offset vertically from each other so as to embrace slidably the rod 59. At its front the plate 73 is bent upwardly and then rearwardly to provide the carriage with a top flange 76 overhanging a portion of the bottom plate 73. Extending forwardly from the upwardly-bent portion of the carriage are two lugs 77 and 78. These lugs are apertured to receive a sleeve 80 which is mounted slidably on the cross rod 60. The sleeve has a collar 81 at its left end provided with a groove 82. The left lug 77 embraces this collar and has an inwardly-extending key 83 engaging the groove 82 to lock the sleeve against turning movement relative to the carriage. The right lug 78 embraces a reduced-diameter portion 84 of the sleeve and is clamped tightly against a shoulder 85 of the sleeve by a nut 86 threaded on the portion 84 thereof. Thus the carriage is secured firmly to the sleeve 80 and is mounted for free back-and-forth traveling movement along the rods 59 and 60.

The bottom plate 73 and top flange 76 of the carriage 66 are bridged by a vertical pin 87. (It is to the upper end of this pin that one end of the link 72 is pivoted as shown in Figure 2.) On this pin 87 beween the flange 76 and bottom plate 73 there is journalled a circular feed nut 89 which engages continuously the feed screw 53. This feed nut has a depending shank provided with a collar 90 to which is staked a gear 91. This is a relatively large gear which projects through a slot 92 in the forward wall of the carriage 66 (Figure 4). Mounted on the top side of the plate 73 to the right of this gear is a stud 93 on which there is pivoted a rock lever 94. Pivoted on the free end of this rock lever is a pawl 95 having two teeth 95*a* and 95*b* for engaging the gear 91. The pawl is urged clockwise, as it appears in Figures 5 and 7, by a light cantilever spring 96 mounted on the rock lever, the limit position of the pawl being defined by the abutment of a stop lug 95*c* thereof against the rock lever. The rock lever is itself urged counterclockwise by a tension spring 97 connected between the end thereof and a pin on the carriage 66. When the rock lever 94 is in an actuated position (Figure 7) the pawl is totally disengaged from the gear 91 and is held at such angular position that the tooth 95*a* thereof is positioned nearer the gear 91 than is the tooth 95*b*. When the rock lever is released it is moved to its normal position by the spring 97. As the rock lever is so moved, the tooth 95*a* first engages a space between two teeth of the gear 91 and turns the gear clockwise by the peripheral distance between two successive teeth thereof (in view of the tooth 95*a* having a component of movement towards the stud 93 as the pawl is turned counterclockwise to bring both teeth thereof in engagement with the gear) and finally the second tooth 95*b* also engages the gear so as to latch the gear in its actuated position. This clockwise movement of the gear backspaces the carriage 66 which in turn backspaces the carriage 35 and reproducer 44. Thus upon each reciprocation of the rock lever from and back to normal unactuated position, the carriage 66 is first unlatched with respect to the feed screw (but remains stationary because of the friction in its mounting) and is then backspaced one step and again latched to the feed screw. It is by successively actuating the rock lever 94 that the reproducer 44 is back-spaced across the record R to any desired amount. It is by latching the gear 91 that the drive transmission between the motor and the carriages 35 and 66 is rendered effective since when the gear 91 is latched a turning of the feed screw 53 will progressively advance the respective carriages along their paths of traveling movement.

The means for actuating the rock lever 94 comprises an electromagnet 98 having two coils 99 and 100 provided with respective iron cores 101 and 102. Each of these cores is riveted at one end to an iron yoke 103 (Figure 7). The yoke is secured by screws 103*a* to the under side of the carriage 66 so as to support the electromagnet 98 with the axes of its coils in a horizontal plane. Secured by screws 104 to the ends of the yoke is a U-member 105 of non-magnetic material which embraces the two coils and which has apertures receiving the cores 101 and 102 to rigidify the latter. One of the cores 102 extends beyond the member 105 and has a magnetic armature 106 pivoted thereto at 107. The armature carries an upstanding pin 108 at its free end (Figures 5 and 6) which engages a clearance hole 109 in an arm 93*a* of the rock lever, this arm being positioned ahead of the pivot stud 93 and offset downwardly from the plate 73 of the carriage 66. The spring 97 acting through the rock lever 94 and its coupling 108—109 with the armature normally holds the free end of the armature spaced from the adjacent core 101. When the electromagnet is energized, however, a magnetic flux circuit is completed through the cores 101 and 102 by way of the yoke 103 and the armature 106, and as a result the armature is drawn against the core 101 to disengage the pawl 95 from the gear 91. When the current supply of the electromagnet is next cut off, the spring 97 reengages the pawl with the gear 91 first to backspace it and next to latch it in its backspaced position as above described, and at the same time the armature is disengaged from the core 101.

Mounted on the carriage 66 is a bracket 110 having one arm 111 secured by screws 112 to the flange 76. This arm of the bracket extends forwardly into a laterally-extending opening 113 provided in the frame section 14, the arm being provided with a downward offset at 114 near its forward end so that it will clear the top rim of the frame section 14. Within the opening 113 the bracket 110 has a vertical member 115. This member has an apertured lug 115$a$ turned rearwardly from the right end thereof, which is clamped between the lug 78 and nut 86 to the sleeve 80 to provide a rigidifying support for the bracket. Mounted on the frame section 14 and overlying the opening 113 at the front thereof is a stationary holder 116 for an index slip (not shown). Secured at 117 to the member 115 is a pointer 118 which extends forwardly past the under side of the holder and then upwardly across the front of the holder. This pointer is adapted to serve as an indicator to enable the transcriber, as when the pointer is aligned with annotating marks on the index slip, to set the reproducer 44 at selected portions of the recorded matter.

Mounted on the forward side of the member 115 is a U-bracket 119 carrying a cross rod 120 on which there is pivoted a hand lever 121. This hand lever projects forwardly past the under side of the holder 116 and has a fingerpiece 121$a$ on its forward end. The hand lever extends rearwardly at 122 from its pivot axis and carries an upright insulating button 123 which is held in contact with the under side of a horizontal switch blade 124 of a normally-open switch 125, the contact being maintained in response to a clockwise weight-biasing of the hand lever. The switch blade 124 and a second cooperating stationary blade 124$a$ of the switch 125 are supported one above the other in an insulating stack 126 secured to the under side of the arm 113. Upon depressing the hand lever 121, to move it in the direction of the arrow A as it appears in Figure 6, the lower switch blade 124 is moved upwardly to close the switch 125. This switch, as will appear, is provided to control the electromagnet 98 as is hereinafter described.

Figure 12:
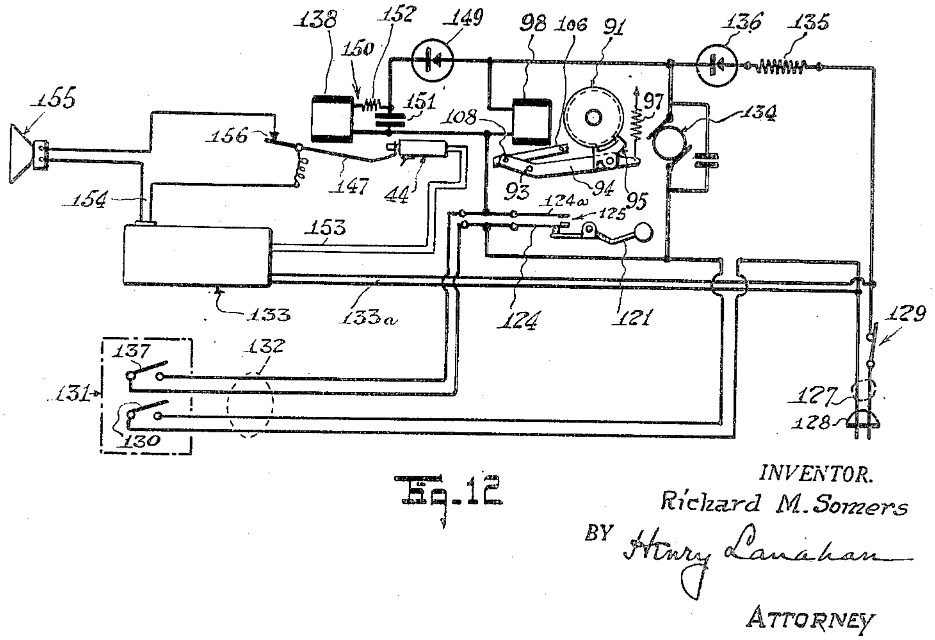
Figure 12 is a diagrammatic view of circuits and mechanism according to my invention.

By reference to Figure 12, it will be seen that the electrical current supply for the machine is provided by way of a cable 127 connected to a plug 128 that is to be inserted in a wall socket of a 110-volt A. C. or D. C. current supply line. In series with one lead of the cable is a local master on-off switch 129 for the machine, and in series with the second lead of the cable is a remote on-off master switch 130 provided in a remote control box 131, the control box being connected to the machine by way of a cable 132. It will be understood that the master switch 129 is closed as whenever the machine is on stand-by, and that the second master switch 130 is to be placed in "on" position whenever the machine is to be put into use. For instance, when the master switch 129 is closed an electric amplifier 133 for the audio system of the machine receives operating current by way of a cable 133$a$, the master switch 129 and cable 127, and thus it stands ready for instant use. When also the master switch 130 is closed, power is supplied to a drive motor 134 by way of a voltage cut-down resistor 135 and rectifier 136. The rectifier, and a condenser 134$a$ across the motor, are provided to afford always a steady direct-current supply for the drive motor since in so doing the drive system is rendered wholly universal—i. e., operable from D. C. and A. C. current supplies without need for selective adjustment of the drive system.

The current supply circuit for the electromagnet 98 serially includes both master switches 129 and 130, the resistor 135 and the rectifier 136. Additionally, this circuit serially includes the local manually-operable switch 125 and a remote switch 137 connected in parallel therewith by way of the cable 132, this switch 137 being included also in the control box 131. Thus, upon both master switches being closed to render the amplifier and motor operative, and either the switch 125 or switch 137 being closed, the electromagnet 98 is energized to withdraw the pawl 95 from the gear 91. When that one of the switches 125 or 137 is next opened the electromagnet is de-energized and the pawl is returned to backspace the gear 91 one step and then to latch the same. Thus each momentary depressing of the handle 121 or remote switch 137 causes the reproducer to be backspaced across the record by a predetermined amount. Typically, the operator will mount the control box 131 at the front of her typewriter and use the switch 137 for backspacing. However, when it is desired to backspace the carriage a considerable distance, or to advance it by any amount, she will depress the hand lever 121 to uncouple the carriage 66 from the feed screw and then move the carriage manually by the hand lever.

It has been found from many tests that if a reproducer is drawn across a plastic record recorded by the embossing method, with normal pressure of the reproducer stylus on the record, the stylus will nick the ridges at the sides of the groove convolutions so deeply as to cause the reproducer oftentimes to jump the grooves when the recordation is next reproduced. Particularly, this is true if the grooves are made shallow so as to enable close spacing of successive groove convolutions. It is found moreover that if the reproducer is lifted from the record during each backspacing so as to avoid the damage just noted, other problems are introduced which are difficult to solve since then each lowering of the reproducer must be gradual so as not to indent the record. By the present invention these difficulties are overcome, however, by relieving much of the pressure of the reproducer from the record during backspacing but without ever lifting the reproducer clear of the record. This pressure-relieving means includes an electromagnet 138 having a magnetic U-shaped frame 139 provided with a central core 140 on which there is mounted a coil 141. Spring-hinged to one leg of this frame 139 is an armature 142 normally held in spaced relation to the core 140 (Figure 8) but which is drawn against the core, to complete the magnetic circuit between the core and the frame, when the coil is energized (Figure 9). This electromagnet is mounted on the under side of the carriage 35 to the rear of the reproducer 44 and has the free end of the armature thereof facing towards the free end of the reproducer. Riveted to the under side of the armature is a light cantilever spring 143 having a free end portion extending to the reproducer and terminating in an upturned lug 144 at its forward end, this lug being provided with a V-notch 145 as shown in Figure 11. Extending rearwardly from the reproducer is a lift pin 146 which overlies the lug 144 at a clearance distance therefrom when the armature is in an unactuated position. The free end of the cantilever spring 143 is urged upwardly relative to the armature 142 but its uppermost position is defined by abutment of the spring against a rigid bar 147 also riveted to the armature. By way of example, the bar 147 is positioned below the spring 143 and the latter is provided with a clearance opening 148 (Figure 10) near its free end through which the end portion of the bar projects to overlie the spring 143 and provide a stop therefor. The spring 143 has preferably a low stiffness constant but is held sufficiently loaded by the stop bar 147 so as to exert a force thereagainst which is a substantial proportion of but less than the force with which the reproducer is biased against the record. Thus, when the armature 142 is actuated upwardly, the spring 143 will yield to the weight of the reproducer, so as not to lift the reproducer from the record, but so as to relieve a predetermined amount of the pressure of the reproducer stylus from the record. For instance, for a reproducer having a biasing force on the record of the order of 30 grams, the force of the lifting spring 143 against the reproducer may typically be of the order of 15 to 20 grams.

The notch 145 has the edges thereof at approximately 45° with the horizontal. Accordingly, when the spring is raised to relieve pressure of the reproducer from the record, the engagement of one or the other of these edges of the notch with the pin 146 will cause a side thrust on the reproducer equal to the amount by which the pressure is relieved from the record. This side thrust is effective to center the reproducer relative to the carriage 35 without however disengaging the reproducer stylus from the record.

The electromagnet 138 is controlled by the same switches 125 and 137 as control the electromagnet 98. In order however to assure that the electromagnet 138 will be energized during the actual time of backspacing of the reproducer, its energization period is prolonged over that of the electromagnet 98. This prolongation is obtained by supplying current to the electromagnet 138 through a unidirectional conducting device, or rectifier 149, and then through a time-delay circuit 150 provided between the rectifier and the electromagnet, this time-delay circuit comprising for example a condenser 151 bridged across the supply line and resistor 152 in series with the line between the condenser and the electromagnet (Figure 12). When either switch 125 or 137 is closed the electromagnet 98 is operated immediately and the condenser 151 is charged up almost instantly, in view of the relatively low resistance of the rectifier 149, to cause almost immediate operation of the electromagnet 138. (Note though that a delay in the charging of the condenser is unimportant since the backspacing of the carriage does not occur until the switch 125 or 137 just closed is reopened.) When that switch is reopened, the electromagnet 98 deenergizes instantly but the electromagnet 138 is maintained energized for a moment longer by the current discharge of the condenser 151, it being noted that this condenser can discharge only through the electromagnet in view of the unidirectional characteristic of the rectifier 149. Thus, it is assured that the pressure of the reproducer on the record is relieved during the actual backspacing thereof.

In order that a sliding of the reproducer across the record groove convolutions during backspacing may not give rise to disturbing noises in the receiver, the audio system is preferably disabled during backspacing. It will be understood that the audio system comprises the reproducer, a circuit 153 by which the reproducer is connected to the input of the amplifier 133, the amplifier 133, an output circuit 154 of the amplifier and a receiver 155 in the output circuit shown for example as a small speaker. This disabling of the audio system is carried out, for instance, by opening the output circuit 154 by means of a switch 156. This switch has a stationary contact 157 mounted insulatedly on the frame 139 of the electromagnet 138 and has a cooperating movable contact 158 mounted insulatedly on an upturned arm 147a of the bar 147. The switch is normally closed but is opened when the electromagnet 138 is energized. Since the energization period of the latter is delayed from that of the electromagnet 98, it follows that the output circuit 154 is held open when the actual backspacing occurs.

On the free end of the reproducer 44 there is an insulating finger 159 overlying the arm 172a of the lever 172. As hereinbefore described, this lever is held in a raised position whenever the record-clamping mechanism is unactuated or actuated without a record being on the turntable. In this raised position of the lever it contacts the finger 159 to withhold the reproducer from the turntable. Thus, the reproducer is free to move downward into its lowered effective position, in response to its downward bias, only when a record is mounted on and clamped to the turntable. This lever 172 is the only means provided in the present machine for lifting the reproducer from the turntable.

The machine herein particularly shown and described illustrates the different features of my invention but no unnecessary limitation to details of the machine or to machines of the disk-record type, or to machines for reproducing records recorded by the embossing method, is intended. Rather, I endeavor to express the scope of my invention in terms of the following claims.

I claim:

1. In a machine for reproducing recorded dictation comprising a rotatable support for a record, a record-cooperable reproducing device biased to engage a supported record and mounted for forward and backward traveling movement across the record, and a drive motor for the machine: the combination of a drive transmission operable by said motor to effect a forward traveling movement of said reproducing device relative to said record, said drive transmission including reciprocable means effective during each complete reciprocation thereof to cause said transmission to be disabled, said reproducing device to be backspaced a predetermined amount and said transmission to be thereupon re-abled; control means operable successively to cause successive reciprocations of said reciprocable means; means for relieving partially the pressure of said reproducing device from the record while the reproducing device is being backspaced; an electromagnet for operating said pressure-relieving means; and a switch operable by said control means for supplying current to said electromagnet.

2. In a machine for reproducing recorded dictation comprising a rotatable support for a record, a record-cooperable reproducing device biased to engage a supported record and mounted for forward and backward traveling movement across the record, and a drive motor for the machine: the combination of a drive transmission operable by said motor to effect a forward traveling movement of said reproducing device relative to said record, said transmission including reciprocable means having a normal position and effective when reciprocated from and to said position for disabling said transmission, backspacing said reproducing device relative to the record and then re-abling said transmission in the sequence here named; means operable to relieve partially the pressure of said reproducing device from the record; a first electromagnet for operating said reciprocable means from said normal position; a second electromagnet for operating said pressure-relieving means; a common on-off control means for said electromagnets; and timing means relatively influencing said electromagnets when said control means is moved to "off" position for causing said second electromagnet to be maintained in operated position momentarily after said first electromagnet is returned to unoperated position.

3. The combination set forth in claim 2 wherein said last-stated means comprises a unidirectional current-conducting device in the current-supply circuit of said second electromagnet and a condenser connected across said current-supply circuit between said conducting device and said second electromagnet.

4. In a machine for reproducing recorded dictation comprising a rotatable support for a record, a record-cooperable reproducing device biased to engage a supported record and mounted for forward and backward traveling movement across the record, and a drive motor for the machine: the combination of a manual control member mounted for traveling movement and for reciprocation in directions transverse to its path of traveling movement; means coupling said control member to said reproducing device to cause traveling movement of the latter as the former is moved along said path; means biasing said control member to retain the same normally in a predetermined position within its path of transverse movement; reciprocable means biased into a normal position and effective on each full reciprocation from and to said position to effect a predetermined backspacing of said reproducing device relative to the record; an electromagnet for operating said reciprocable means from normal position; and means responsive to said control member as the same is moved in said transverse path from its said normal position and returned thereto for causing a momentary energization of said electromagnet.

5. A drive mechanism for a carriage of a dictating machine comprising a frame; a mounting on said frame for supporting said carriage for rectilinear traveling movement; a feed screw extending along the path of movement of said carriage; a circular feed nut journalled on said carriage and continuously engaging said feed screw; a rock lever pivoted to said carriage; a doubly-toothed pawl pivoted at its central portion to said rock lever and effective when both teeth thereof are in engagement with said feed nut for latching the feed nut to said carriage; means for moving said rock lever back and forth respectively to disengage said pawl from said feed nut and to move it into latching engagement therewith; and means connected to said pawl for turning the pawl relative to said rock lever when the pawl is disengaged from said feed nut whereby upon returning the pawl into latching engagement with the feed nut one tooth thereof will first engage the feed nut and turn it to space said carriage along its said path before the feed nut is latched.

6. In a machine for reproducing recorded dictation comprising a support for a record and a record-cooperating translating device biased against the said record: a device for only partially relieving pressure of said translating device from the record comprising a pivoted member actuatable into a terminal position; a lift member movably mounted on said pivoted member and having the free end thereof engageable with said reproducing device to exert pressure on the latter away from the record, said lift member being biased relative to said pivoted member in the direction of actuation thereof with a force less than that required to lift the reproducing device from the record; and a stop on said pivoted member for said lift member and against which the latter is normally held in response to its bias.

7. In a machine for reproducing recorded dictation comprising a rotatable support for a record, and a record-cooperable reproducing device biased to engage a supported record and mounted for forward and backward traveling movement relative to said record: the combination of a drive transmission coupled to said reproducing device and operable to produce a forward travelling movement of the same; means included in said transmission and comprising an electromagnet effective when momentarily energized for backspacing said reproducing device; means comprising an electromagnet operatively associated with said reproducing device and means operable by said electromagnet for relieving only partially the biasing force of the device from the record; and a control switch for both of said electromagnets operable to cause said device to be backspaced and concurrently to cause the biasing pressure of said device to be partially relieved from the record without disengaging the device from the record.

8. In a machine for reproducing recorded dictation comprising a support for a record, a carriage mounted for traveling movement across a mounted record, and a record-cooperating reproducer biased against said record and universally mounted on said carriage: the combination of a drive mechanism connected to said carriage for advancing the carriage across the record and for holding the carriage against manual movement thereof, said drive mechanism including operable means for releasing the carriage from said drive means; power means; means operable by said power means for moving said reproducer into a predetermined centralized position relative to said carriage, for relieving partially the biasing pressure of the reproducer from the record and for operating said releasing means; control means movable into operated position to render said power means operative; and spring operable means effective upon return of said control means to unoperated position for backspacing said carriage, restoring said biasing pressure and returning said releasing means to ineffective position.

9. In a machine for reproducing recorded dictation comprising a support for a record, a carriage mounted for traveling movement across a mounted record, and a record-cooperating reproducer biased against said record and universally mounted on said carriage: the combination of a drive mechanism for advancing said carriage across the record; power means energizable for moving said reproducer into a predetermined centralized position relative to said carriage and for relieving partially the biasing pressure of said reproducer from the record; control means movable into operated position to render said power means operative; and spring operable means effective upon return of said control means to unoperated position for backspacing said carriage and for restoring said biasing pressure.

10. In a machine for reproducing recorded dictation comprising a rotatable support for a grooved record, a movably-mounted record-cooperable reproducing device, an electrical-type reproducing audio system connected to said reproducing device for reproducing sounds picked up thereby, means mounting said record support and reproducing device for relative traveling movement, and means for producing a normal bias of said device against the record: the combination of electrically controllable means associated with said device and continuously energizable for reducing the bias thereof to a constant positive value below normal; switch means for disabling said reproducing audio system; electrically controllable means for producing backspacing traveling movement between said record support and reproducing device across the grooves of said supported record; circuit means intercoupling said two electrically controllable means; and a common control means for said two electrically controllable means and said switch means operable to cause the bias pressure of said reproducing device on the record to be reduced and said audio system to be disabled as said device is backspaced across the record grooves.

11. In a machine for reproducing recorded dictation comprising a rotatable support for a grooved record, a movably-mounted record-cooperable reproducing device, an electrical-type reproducing audio system connected to said reproducing device for reproducing sound picked up thereby, means mounting said record support and reproducing device for relative traveling movement, and means for producing a normal bias of said device against the record: the combination of a continuously actuatable means operable on said reproducing device to reduce the bias thereof to a constant positive value below normal; means actuatable in coordination with actuation of said bias-reducing means for disabling said audio system; means repeatedly actuatable to effect step-by-step backspacing of said reproducing device across the record; a common actuator control for said bias-reducing means, disabling means and backspacing means; and means operatively connecting said common actuator control to said bias-reducing, disabling and backspacing means and including means for timing the operations thereof with respect to each other as said control is operated for causing the bias pressure of said reproducing device to be reduced without disengaging the device from the record and for causing said audio system to be disabled while said device is being backspaced.

RICHARD M. SOMERS.

References Cited in the file of this patent

UNITED STATES PATENTS

| Number | Name | Date |
|---|---|---|
| 1,030,740 | Macdonald | June 25, 1912 |
| 1,979,829 | Gramann | Nov. 6, 1934 |
| 2,008,356 | Johnson | July 16, 1935 |
| 2,012,326 | Thompsett | Aug. 27, 1935 |
| 2,016,887 | Brown | Oct. 8, 1935 |
| 2,079,515 | Ligh | May 4, 1937 |
| 2,152,440 | Norton et al. | Mar. 28, 1939 |
| 2,320,572 | Dann | June 1, 1943 |
| 2,332,784 | De Sart | Oct. 26, 1943 |
| 2,348,204 | Brubaker | May 9, 1944 |